United States Patent
Chen et al.

(10) Patent No.: US 7,096,155 B2
(45) Date of Patent: Aug. 22, 2006

(54) METHOD, SYSTEM AND APPARATUS FOR PROVIDING REAL-TIME LED STATUS OF EMBEDDED CONTROLLERS TO SYSTEM MANAGEMENT SOFTWARE

(75) Inventors: Wei Chen, Round Rock, TX (US); Bharath Vasudevan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 355 days.

(21) Appl. No.: 10/377,836

(22) Filed: Mar. 3, 2003

(65) Prior Publication Data

US 2004/0176927 A1 Sep. 9, 2004

(51) Int. Cl.
  *G06F 19/00* (2006.01)

(52) U.S. Cl. .................. 702/182; 702/182; 702/57; 702/108; 702/117; 324/133; 324/556; 712/227; 719/311; 719/318; 700/83; 700/90; 361/93.2

(58) Field of Classification Search ............... 702/57, 702/81, 108, 117, 122, 127, 182–185; 324/133, 324/556; 712/227, 205; 719/311, 318; 700/79–92; 361/93.2
See application file for complete search history.

(56) References Cited

U.S. PATENT DOCUMENTS

| 5,063,383 A | * | 11/1991 | Bobba | ................ 341/120 |
| 5,331,571 A | * | 7/1994 | Aronoff et al. | ................ 716/4 |
| 5,623,691 A | | 4/1997 | Clohset et al. | .............. 395/821 |
| 5,761,527 A | | 6/1998 | Clohset et al. | .............. 395/821 |
| 6,192,496 B1 | * | 2/2001 | Lawrence et al. | .......... 714/724 |
| 6,421,790 B1 | * | 7/2002 | Fruehling et al. | ............. 714/30 |
| 6,512,985 B1 | * | 1/2003 | Whitefield et al. | ........... 702/81 |
| 2002/0077782 A1 | * | 6/2002 | Fruehling et al. | ........... 702/185 |

OTHER PUBLICATIONS

Brinkschulte et al., 'A Microkernel Middleware Architecture for Distributed Embedded Real–Time Systems', Jan. 2000, UOK, pp. 1–9.*
Kurdthongmee, NECTEC Technical Journal, 'Utilization of an Embedded System in Physics Laboratory', May 2001, pp. 165–171.*
Philips Semiconductors, 'The I2C–bus and how to use it (including specifications)', Apr. 1995, pp. 3–3 to 3–26.*

* cited by examiner

*Primary Examiner*—Hal Wachsman
*Assistant Examiner*—Elias Desta
(74) *Attorney, Agent, or Firm*—Baker Botts L.L.P.

(57) ABSTRACT

Embedded controller(s) in an information handling system have real-time status and activities represented by indicators, such as light emitting diodes (LEDs), associated with the embedded controller(s). These indicators may be monitored for example by operating (management software, e.g., Embedded Server Management (ESM) software. In addition, edge triggered latches and a timer detect and store flash patterns of these LED indicators so that the flash pattern information may be read by the operating management software as static signals.

14 Claims, 3 Drawing Sheets

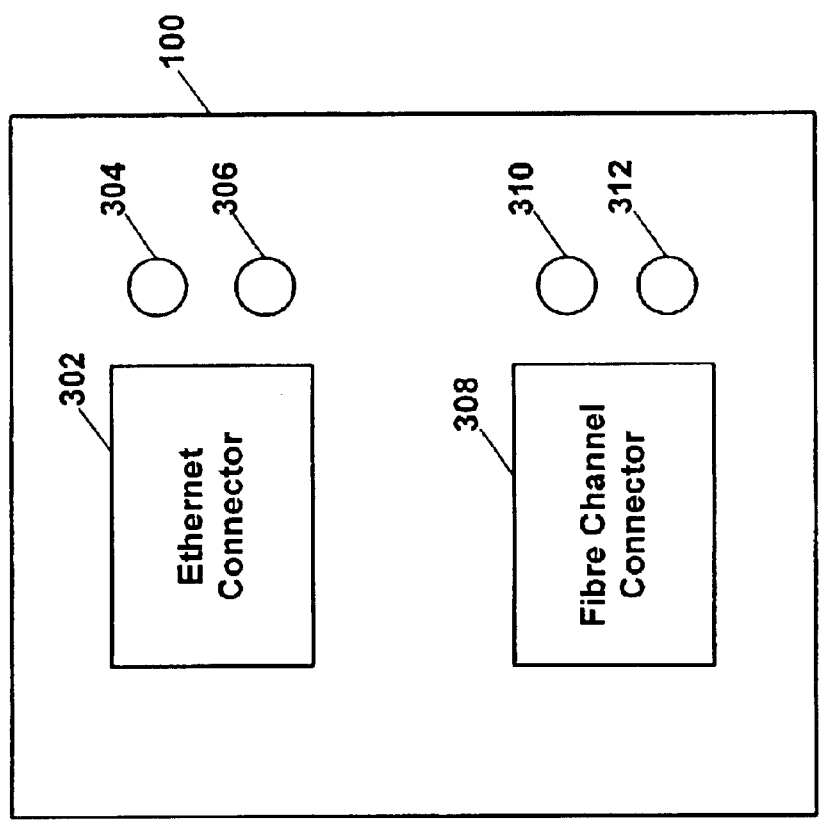

METHOD, SYSTEM AND APPARATUS FOR PROVIDING REAL-TIME LED STATUS OF EMBEDDED CONTROLLERS TO SYSTEM MANAGEMENT SOFTWARE

BACKGROUND OF THE INVENTION
TECHNOLOGY

1. Field of the Invention

The present invention is related to information handling systems, and more specifically, to providing real-time status of embedded controllers in the information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

Recent trends in information handling systems such as workstations, computer servers and associated storage disk arrays are being developed with embedded high-speed input/output (I/O) controllers, e.g., Gigabit Ethernet and Fibre Channel controllers, and the like. Typically, these embedded controllers have light emitting diodes (LEDs) proximate their I/O connectors to indicate link/activity status of the high-speed connection thereto. These LEDs are usually the only indication of a specific controller's status and/or activities.

While static information from, e.g., plug and play, and power-on system testing (POST) may disclose the presence of embedded controllers in an information handling system, there is no way of determining remotely, e.g., software monitoring and display screens, the health and/or activities of these embedded controllers.

A prior technology, represented in U.S. Pat. No. 5,761, 527, obtains PCI bus hard disk activity information by monitoring the PCI GNT signal. The advantage of this technology is that it can be adapted to both PCI add-on cards and embedded PCI devices. However, the PCI GNT signal does not represent an accurate indication of the activity on high-speed Ethernet or fibre channel (FC) networks because the Ethernet and FC controllers often buffer large blocks of data before going onto the PCI bus to request the host processor to process the data. Thus, PCI bus activity cannot properly represent either Ethernet or FC network activities. Other existing technologies may display the static characteristics of the controllers such as IP address, storage area network (SAN) connectivity, and the like.

Therefore, a problem exists, and a solution is required for monitoring real-time status and activity information of embedded controllers in information handling systems.

SUMMARY OF THE INVENTION

The present invention remedies the shortcomings of the prior art by providing a method, system and apparatus for monitoring real-time information by information handling system management software which may then display this real-time information. In addition, the real-time information that varies from desired operating parameters may be noted, e.g., alarming, technician paging, and the like.

In an exemplary embodiment of the present invention, an information handling system having an embedded controller (s) is adapted so that real-time status and activities of the network interface, represented by light emitting diodes (LEDs) associated with the embedded controller(s), may be monitored by operating management software, e.g., Embedded Server Management (ESM) software. In addition, a further exemplary feature of the present invention is disclosed herein for detection of flash patterns of these LEDs.

A common way for ESM software to detect status information is for it to access the $I^2C$ bus(es) of the information handling system, and periodically poll these buses for the desired status information. Also coupled to the $I^2C$ bus(es) are sensors and microcontrollers which are used to detect and format the status information from the various devices (controllers) embedded in the information handling system. The $I^2 C$ bus specification, version 2.1, January 2000, is available from Philips Semiconductors, and is incorporated by reference herein. It is contemplated and within the scope of the present invention that any type of input interface hardware and protocols may be used in the present invention, so long as a desired status input may be recognized by the information handling system input devices and thereby read by the ESM software for processing thereof.

Status information monitoring systems and devices, e.g., I/O devices coupled to an $I^2C$ bus generally are adapted for most static or slowly-changing signal levels. However, when rapidly changing signals, e.g., flashing LED blink patterns, are of interest to the ESM, a more practical and economical way to detect these rapidly changing status signals is to translate them into static status signals more easily read at a desired time by the ESM software. Whereby the ESM software may check static status signals only when an update on the status information is required. The present invention may also be used for other information handling system monitoring and status applications, e.g., server blower LED status, rear or front CYCLOPS (TM) status (color of single light representing health of system) and the like.

A technical advantage of the present invention is monitoring real-time status and activity of an embedded controller normally represented by associated LED indicator state and flash rates. Another technical advantage is using ESM software for display, monitoring and out of norm alarming of real-time status and activity of embedded controllers, e.g., Ethernet and FC controllers.

BRIEF DESCRIPTION OF THE DRAWINGS

A more complete understanding of the present disclosure and advantages thereof may be acquired by referring to the following description taken in conjunction with the accompanying drawings wherein:

FIG. 3 is a schematic block diagram of exemplary embedded controller external input-output connectors and associated indicator lights in an information handling system.

Figure 1:
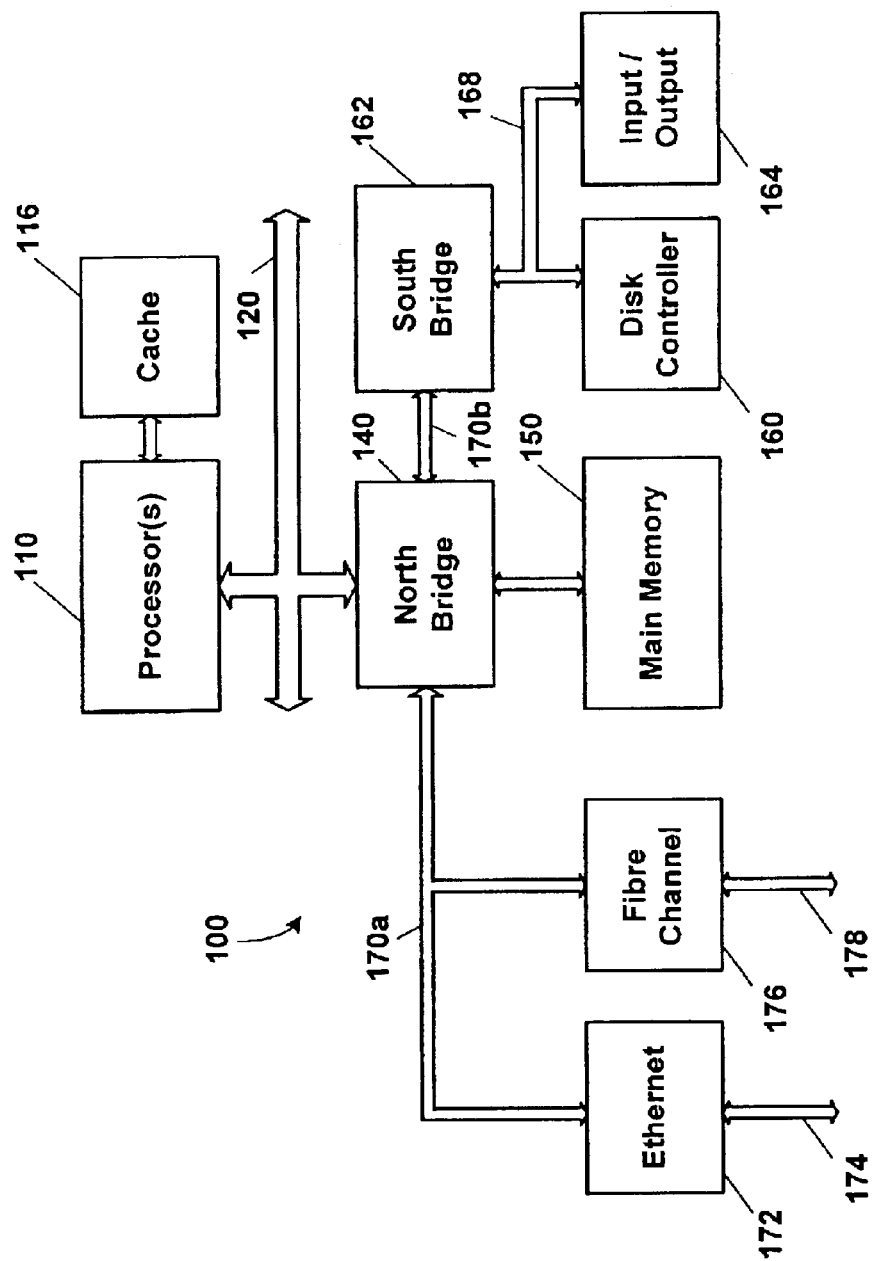
FIG. 1 is a schematic block diagram of an exemplary embodiment of an information handling system.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of an exemplary embodiment of the present invention are schematically illustrated. Like elements in the drawings will be represented by like numbers, and similar elements will be represented by like numbers with a different lower case letter suffix.

Referring to FIG. 1, an information handling system is illustrated having electronic components mounted on at least one PCB and communicating data and control signals therebetween over signal buses. In one embodiment, the information handling system is a computer system. The information handling system, generally referenced by the numeral 100, comprises a processor(s) 110 coupled to a host bus(es) 120 and a cache memory 116. A north bridge(s) 140, which may also be referred to as a "memory controller hub" or a "memory controller," is coupled to a main system memory 150. The north bridge 140 is coupled to the system processor(s) 110 via the host bus(es) 120. The north bridge 140 is generally considered an application specific chip set that provides connectivity to various buses, and integrates other system functions such as memory interface. For example, an Intel 820E and/or 815E chip set, available from the Intel Corporation of Santa Clara, Calif., provides at least a portion of the north bridge 140. The chip set may also be packaged as an application specific integrated circuit ("ASIC"). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI buses 170a and 170b, AGP bus coupled to graphics display (not shown), etc. The second bus may also comprise other industry standard buses or proprietary buses, e.g., ISA, SCSI, USB buses 168 through a south bridge (bus interface) 162. These secondary buses 168 may have their own interfaces and controllers, e.g., ATA disk controller 160 and input/output interface(s) 164.

In the information handling system 100, according to the present invention, embedded controllers, e.g., an Ethernet controller 172 and a Fibre Channel (FC) controller 176 may be coupled to PCI bus 170a. The Ethernet controller 172 is coupled to an Ethernet network 174 and the FC controller 176 is coupled to a Fibre Channel 178. The Ethernet controller 172 and the FC controller 176 each have light emitting diode (LED) status lights located proximate to respective connectors (FIG. 3) to which the Ethernet network 174 and the Fibre Channel 178 are connected. The LED colors and functional operation may be in accordance with industry standards well known to those skilled in information handling systems.

FIG. 3 depicts a schematic block diagram of exemplary embedded controller external input-output connectors and associated indicator lights (LEDs) in the information handling system. An Ethernet connector 302 has status and indication LEDs 304 and 306 associated therewith. A Fibre Channel connector 308 has status and indication LEDs 310 and 312 associated therewith. For exemplary purposes Ethernet LED 304 will also be referenced herein as "Ethernet_Link_LED," Ethernet LED 306 will also be referenced herein as "Ethernet_ACT_LED," Fibre Channel LED 310 will also be referenced herein as "FC_Green_LED" and Fibre Channel LED 312 will also be referenced herein as "FC_Yellow_LED." It is contemplated and within the scope of the present invention that any embedded controller or other information handling system device having indicator lights (LEDs) may benefit from the invention disclosed herein.

As an example, two tables representing possible LED states and associated function indications for the Ethernet and Fibre Channel controllers are as follows:

TABLE 1 for the Ethernet Controller LED Status and Indication

| Ethernet_Link_LED | Ethernet_ACT_LED | Activity |
|---|---|---|
| On | Off | Link |
| On | Flashing | Activity |
| Off | Off | Off |

TABLE 2 for the FC Controller LED Status and Indication

| FC_Green_LED | FC_Yellow_LED | Activity |
|---|---|---|
| On | On | Power |
| On | Off | On-Line |
| Off | On | Signal Acquired |
| Off | Flashing | Loss of Synchronization |
| Flashing | Flashing | Firmware error |

Figure 2:
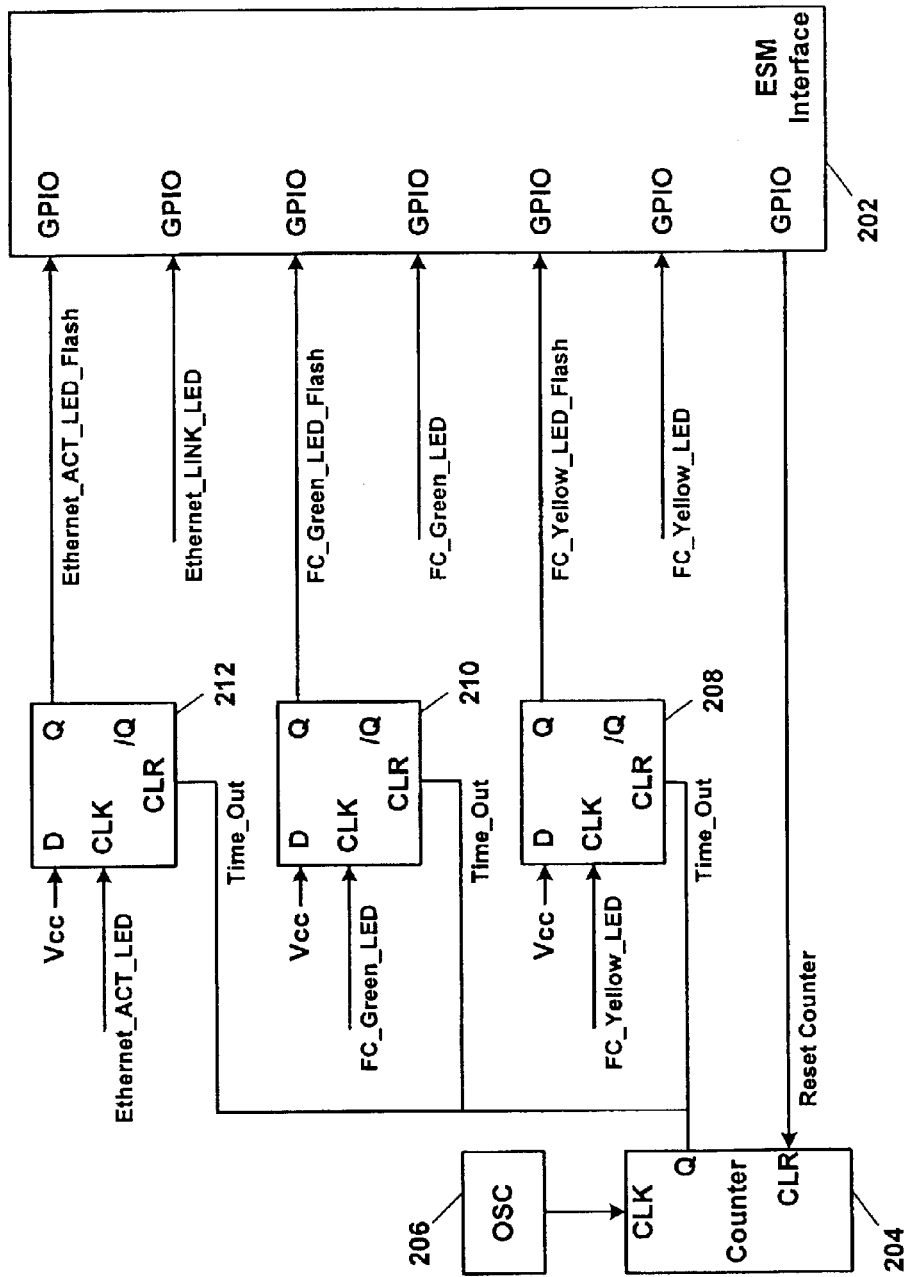
FIG. 2 is a schematic block diagram of a circuit for monitoring LED status of embedded controllers, according to an exemplary embodiment of the present invention.

Referring now to FIG. 2, depicted is a schematic block diagram of a circuit for monitoring LED status of embedded controllers, according to an exemplary embodiment of the present invention. An Embedded Server Management (ESM) interface 202 has a plurality of inputs coupled to the embedded controller LEDs (304, 306, 310 and 312, FIG. 3). Outputs of a plurality of edge triggered latches or registers 208, 210 and 212 are also coupled to inputs of the ESM interface 202. Some of the embedded controller LEDs (306, 310 and 312, FIG. 3) also may be coupled to inputs of the registers 208, 210 and 212. The registers 208, 210 and 212 may be for example, but not limited to, D-type flip-flops. According to the exemplary embodiment illustrated in FIG. 2, whenever there is a positive transition at the CLK (clock) input of a register, the output (Q) of the register will assume a logic 1 state (high). Whenever a Time_Out is asserted on a CLR (clear) input of a register, the Q-output of the register will assume a logic 0 state (low). An oscillator 206 and counter 204 may be used to set time periods at which the Q-outputs outputs of the registers 208, 210 and 212 are reset to logic 0. Different time periods may be used to distinguish between different flash rate patterns. The ESM interface 202 may control clearing the counter 204 after the ESM software has read the output logic states of the registers 208, 210 and 212. The ESM interface 202 may be coupled to any general purpose input-output interface, e.g., I²C, etc.

As an example, whenever an LED changes from off to on faster than the reset time period, the Q-output of the associated register will remain in a logic 1 state. The ESM interface 202 can read the Q-outputs of the registers 208, 210 and 212 at any time, and if a logic 1 is read, than the respective LED is presumed to be "flashing." For static (steady state) LED status, direct coupling into the ESM interface 202 is all that is needed. Thus, the registers 208, 210 and 212 may be used to "capture" intermittent events like a flashing LED, whereas the ESM interface 202 is all that is required for static events (events that do not change faster than the ESM software can readily read them through the ESM interface 202). Tables 1 and 2 above are illustrative examples of possible LED status indication. It is contemplated and within the scope of the present invention that other server management applications, e.g., blower LED status, information handling system health LED (CYCLOPS™ status), etc. may also be obtained as disclosed hereinabove.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system having at least one embedded controller with at least one activity-status indicator, said system comprising:
    at least one embedded controller in an information handling system, said embedded controller having at least one activity-status indicator, wherein the at least one activity-status indicator represents activity and status of said at least one embedded controller;
    an interface circuit having an input coupled to the at least one activity-status indicator, whereby the activity and status of said at least one embedded controller is monitored by said information handling system by reading said interface circuit; and
    at least one edge-triggered latch, said at least one edge-triggered latch having an input coupled to the at least one activity-status indicator, an output coupled to another input of said interface circuit and a clear input coupled to an output of a timer circuit, wherein a flash pattern from said at least one activity-status indicator is captured and stored in the at least one edge-triggered latch and represented on the output thereof,
        whereby the flash pattern from said at least one activity-status indicator is monitored by said information handling system by reading said interface circuit, and said at least one edge-triggered latch is cleared at predetermined time intervals by said timer circuit,
        wherein the predetermined time intervals differentiate between different flash patterns.

2. The information handling system according to claim 1, wherein said timer circuit is reset by an output signal from said interface circuit.

3. The information handling system according to claim 1, wherein said at least one activity-status indicator coupled to said interface circuit represents the activity and status of said at least one embedded controller selected from the group consisting of Ethernet_Link_LED, Ethernet_ACT_LED, FC_Green_LED, FC_Yellow_LED, blower LED and system health LED.

4. The information handling system according to claim 1, wherein said at least one activity-status indicator coupled to said at least one edge-triggered latch represents the activity and status of said at least one embedded controller selected from the group consisting of Ethernet_ACT_LED, FC_Green_LED, FC_Yellow_LED, blower LED and system health LED.

5. The information handling system according to claim 1, wherein said at least one activity-status indicator coupled to said at least one edge-triggered latch represents the activity and status of said at least one embedded controller selected from the group consisting of Ethernet_ACT_LED, FC_Green_LED and FC_Yellow_LED.

6. The information handling system according to claim 1, wherein the flash pattern stored in said at least one edge-triggered latch is selected from the group consisting of Ethernet_ACT_LED_Flash, FC_Green_LED_Flash and FC_Yellow_LED_Flash.

7. The information handling system according to claim 1, wherein said information handling system is selected from the group consisting of computer work station, personal computer, portable computer, computer server, print server, network router, network hub, network switch, storage area network disk array, RAID disk system and telecommunications switch.

8. The information handling system according to claim 1, wherein the interface circuit is coupled to an I²C bus.

9. An apparatus for monitoring activity-status of an embedded controller in an information handling system, comprising:

an interface circuit having inputs coupled to activity-status indicators of an embedded controller in an information handling system;

edge-triggered latches coupled to the activity-status indicators, outputs coupled to other inputs of said interface circuit and clear inputs coupled to a timer circuit, wherein flash patterns from said activity-status indicators are captured and stored in the edge-triggered latches and represented on the outputs thereof, whereby the flash patterns from the activity-status indicators are monitored through said interface circuit, and the edge-triggered latches are cleared at predetermined time intervals by said timer circuit, wherein the predetermined time intervals differentiate between different flash patterns; and operating management software adapted to read said interface circuit and present presentations of the activity-status indicator states.

10. The apparatus according to claim 9, wherein said timer circuit is reset by an output signal from said interface circuit.

11. A method for monitoring activity-status of an embedded controller in an information handling system, said method comprising the steps of:

reading logic levels of activity-status indicators with an interface circuit;

monitoring flash repetition rates of the activity-status indicators with edge-triggered latches, wherein a transition from a first logic level to a second logic level for each of the activity-status indicators causes a respective edge-triggered latch to change logic state and the flash repetition rates are determined by resetting the edge-triggered latches at predetermined time intervals;

reading the logic states of the edge-triggered latches with the interface circuits;

reading the logic levels of the activity-status indicators and logic states of the edge-triggered latches from the interface circuit with operating management software; and displaying the logic states and the logic levels with the operating management software on an information handling system display, wherein the displayed logic states and logic levels are representative of the activity-status of the embedded controller.

12. The method according to claim 11, wherein the step of resetting the edge-triggered latches at the predetermined time intervals is done through the interface circuit.

13. The method according to claim 11, wherein the step of resetting the edge-triggered latches at the predetermined time intervals is done with a timer.

14. The method according to claim 13, further comprising the step of resetting the timer with the interface circuit.

* * * * *